Feb. 5, 1952

S. P. DE MATO 2,584,793

GEAR MEMBER

Filed Nov. 13, 1946

INVENTOR.
SAMUEL P. DE MATO
BY
*his* ATTORNEY

Feb. 5, 1952     S. P. DE MATO     2,584,793
GEAR MEMBER

Filed Nov. 13, 1946     2 SHEETS—SHEET 2

INVENTOR.
SAMUEL P. DeMATO
BY
his ATTORNEY

Patented Feb. 5, 1952

2,584,793

UNITED STATES PATENT OFFICE 2,584,793

GEAR MEMBER

Samuel P. De Mato, Rochester, N. Y., assignor to James Cunningham, Son & Company, Rochester, N. Y., a partnership composed of Augustine J. Cunningham and Francis E. Cunningham Application November 13, 1946, Serial No. 709,515

8 Claims. (Cl. 74—460)

This invention relates to driving gearing and, more particularly, to inexpensive pressed steel gearing of a variety adapted for operation under exposed conditions as required, for example, in the driving of certain agricultural implement parts, one object of the invention being to provide an improved gearing of the above character having a more simple, economical and practical type of construction.

Another object is to supply gearing of the nature indicated having a self-clearing construction adapted to operate efficiently under exposure to loose soil, sand, grit, or the like, without clogging, or excessive wear. More specifically stated, a purpose of the invention is to supply such a gearing adapted to operate with a sufficiently close fit between the intermeshing members to avoid excessive wearing away of the tooth contours, but without becoming jammed by subjection to soil, grit, or the like.

A further object is the provision of gearing for the above purposes adapted to be cut and pressed up economically from hot rolled, or other steel plate material, in an efficient and durable form of construction.

Still a further purpose is to provide a simple, practical and efficient method for producing a driving gearing of the character described above.

To these and other ends the invention resides in certain improvements and combinations of parts, all as will be hereinafter more fully described, the novel features being pointed out in the claims at the end of the specification.

Figure 1:
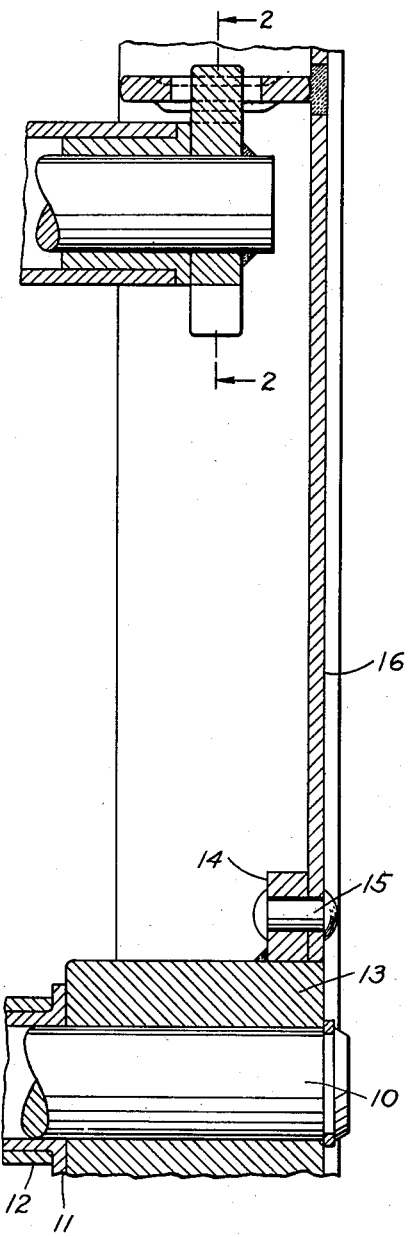
Fig. 1 is a diametrical, sectional view of a portion of an internal gear wheel embodying the present invention.

The invention is embodied in the present instance, by way of illustration, in a gear for driving the ground wheels of a power mower, cultivator or other agricultural machine having an axle 10, Fig. 1, rotatably supported by a bearing sleeve 11 in a supporting tube 12 adapted to be fixed in the main frame of the machine (not shown). Welded, keyed or otherwise fixed on the end of the axle is a wheel hub 13 having welded on its outer end a ring 14 to which is secured, as by rivets 15, a radial flange 16 serving as both the flange of the driving gear wheel embodying the present invention, as well as the flange of one of the ground engaging wheels having its periphery provided with traction cleats (not shown), as well understood in the art. Axle 10 extends through to the other side of the machine and has secured thereto the corresponding ground engaging wheel.

Figure 4:
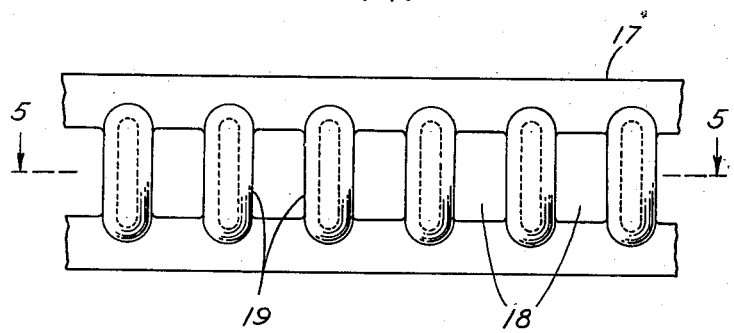
Fig. 4 is a plan view of a portion of a rack embodying the present invention.
Figure 5:
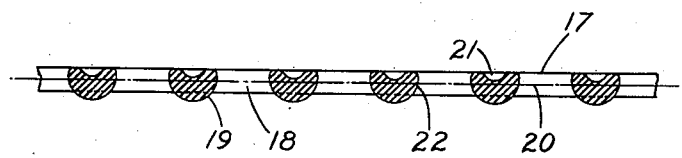
Fig. 5 is a sectional elevation substantially on the line 5—5 in Fig. 4.

The gear wheel embodying the present invention is made from a flat strip of hot rolled or other steel plate material, such as shown at 17, Figs. 4 and 5, say 1½ inches wide, and $\frac{1}{8}$ of an inch thick, with a length of 51.05 inches equaling the circumference of the pitch circle of a gear having a pitch diameter of 16¼ inches, these dimensions being specified, of course, in a merely illustrative way and being subject to a wide range of variation, as conditions may require. Such a strip is punched to produce a series of substantially rectangular openings 18 extending therethrough between the sides of the strip and spaced apart from center to center by a distance equal to the circular pitch of the gear member, say, 0.7854 of an inch in the exemplary set of dimensions given above.

Figure 2:
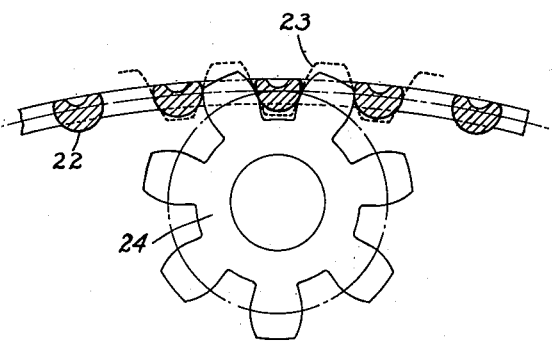
Fig. 2 is a sectional elevation substantially on the line 2—2 in Fig. 1.

The remaining portions of the strip between the adjacent openings are pressed up into special shape to provide the gear teeth 19. That is, the dedendum or depth of tooth below the pitch line 20 is increased by punching a depression 21 in each tooth, say, ⅛ inch wide and $\frac{1}{16}$ inch deep, thus forcing the metal out on the opposite side of each tooth so that it forms a semi-circular contour, 22, closely approximating, at least adjacent the pitch circle, the correct profile of an involute tooth. The close approximation of this tooth contour to the profile of an involute gear tooth is illustrated in Fig. 2 in which this contour is shown in juxtaposed relation with the correct contour or profile 23 of involute gear teeth of corresponding dimensions, and it will be noted that the contours of the teeth of the present invention, at least adjacent the pitch circle, closely approach the shape of theoretical involute teeth, and are thus adapted for meshing engagement with the teeth of a standard involute pinion 24 of corresponding dimensions. Furthermore, the recess 21 pressed in on one side of each tooth, forcing the metal on the other side outwardly, produces a bridgelike conformation between the side edges of the strip which greatly strengthens the strip and the individual teeth.

Figure 3:
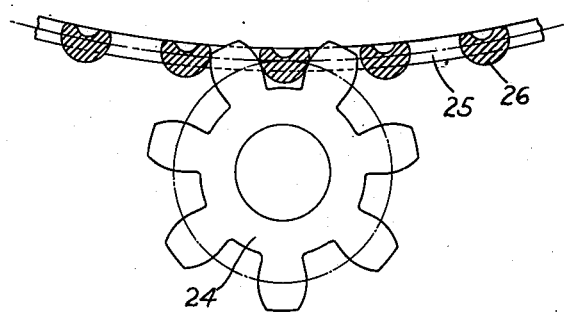
Fig. 3 is a view similar to Fig. 2 but showing a gear wheel of the external type.

To form a circular gear, the strip 17, shaped as described, is then bent into a circle, about a circular form, to bring its ends together to form a complete circle, the ends being welded together in a smooth butt joint. This may be done to form either an internal or an external gear, as desired. To form an internal gear the strip is bent to enclose the active faces of the teeth within the circle formed by the strip, as shown in Figs. 1 and 2, while a gear 25 of the external type may be formed, as shown in Fig. 3, by bending the strip in the opposite direction to position the active faces of the teeth on the outer side of the circle formed by the strip.

The invention is applicable as well to the formation of a rack 17, shown in Figs. 4 and 5, in which the metal strip 17, after being pressed up to form the teeth and teeth intervals described above, is left in flat shape, being stiffened or supported, if desired, by any suitable additional means, for cooperation in the same manner with a mating spur pinion, as described in connection with the foregoing modifications. After the strip 17 is punched and pressed up as described to form the teeth and, where a circular gear is desired, after bending and welding the strip in circular shape, it is cyanide hardened, thus providing a very satisfactory gear when mated with a machine cut cyanide hardened pinion of the same pitch.

It is evident from the above description that the invention provides a gear construction adapted to be readily and inexpensively pressed up from steel plate, with sufficiently close approximation of the theoretical involute gear tooth profile, to operate with a close enough fit between the intermeshing gear and pinion teeth to afford smooth and efficient driving action, without excessive wearing away of the tooth contours, while the open construction of the tooth interval allows any loose soil, sand, grit, or the like to be pressed out and discharged by the pinion teeth as they enter the intervals between the teeth of the gear.

The construction thus affords a gearing of a self-clearing nature adapted to operate efficiently in exposed conditions subject to dirt and grit, as commonly encountered, for example, in driving the ground engaging wheels of agricultural machinery. The invention likewise provides a simple, practical and economical method of forming or pressing up such gears from steel plate material.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A sheet steel gear member comprising an elongated strip having portions thereof removed to form a longitudinally alined series of openings extending therethrough and spaced apart from center to center by a distance equal to the tooth pitch of said member, to provide the tooth intervals, the teeth of said member being formed by the retained portions of said strip intermediate said openings and being each formed toward the same side of said strip with a curved profile shape adjacent the pitch line corresponding approximately to the profile of an involute tooth and said teeth having their opposite ends spaced inwardly from the opposite edges of said strip.

2. A sheet steel gear member comprising an elongated strip having portions thereof removed to form a longitudinally alined series of openings extending therethrough and spaced apart from center to center by a distance equal to the tooth pitch of said member, to provide the tooth intervals, the teeth of said member being formed from the retained portions of said strip lying substantially in the plane thereof intermediate said openings and being each depressed at one side of said strip and projected at the other side thereof into a substantially semi-circular contour adjacent the pitch line approximating the profile of an involute gear tooth, said teeth having their opposite ends integrally connected with and spaced inwardly from the opposite edges of said strip so as to leave said strip with unserrated marginal zones connecting the ends of said teeth.

3. A sheet steel gear member comprising a circular strip having portions thereof removed to form a series of circumferentially alined substantially rectangular openings extending therethrough and spaced apart from center to center by a distance equal to the circular pitch of said member, to provide the tooth intervals, the teeth of said member being formed from the retained portions of said strip between adjacent openings and being each depressed at one side of said strip and projected at the other side thereof into a substantially semi-circular contour adjacent the pitch circle approximating the profile of an involute gear tooth, said teeth having their opposite ends integrally connected with and spaced inwardly from the opposite edges of said strip so as to leave said strip with unserrated marginal zones connecting the ends of said teeth.

4. A sheet steel gear member comprising a wheel having a radially extending, disk-like flange portion, and a circular steel strip having one side edge welded concentrically to said flange portion and having portions thereof removed to form a series of circumferentially alined substantially rectangular openings therethrough spaced apart, from center to center, by a distance equal to the circular pitch of said member, to provide the tooth intervals, the teeth of said member being formed from the retained portions of said strip lying substantially in the plane thereof intermediate said openings, said teeth being each depressed at one side of said strip and projected at the other side thereof into substantially semi-circular contour closely approximating, adjacent the pitch circle, the profile of an involute gear tooth and said teeth having their opposite ends spaced inwardly from the opposite edges of said strip so as to leave said strip with unserrated marginal zones connecting the ends of said teeth.

5. A sheet steel gear member comprising an elongated strip having portions thereof detached to form therein a longitudinally aligned series of openings extending therethrough and spaced apart from center to center by a distance equal to the tooth pitch of said member, said openings having a length substantially equal to the length of the gear tooth and having a width longitudinally of said strip substantially equal to the distance between adjacent faces of adjacent teeth at the pitch circle to provide tooth intervals for the free escape of dirt, the teeth of said member being formed from the retained portions of said strip intermediate said openings and being of substantially concavo-convex shape projecting toward the same side of said strip with a curved profile shape adjacent the pitch line corresponding approximately to the profile of an involute tooth and said teeth having their opposite ends spaced inwardly from the opposite sides of said strip.

6. A driving gearing including a gear member comprising a circular sheet steel strip formed with circumferentially alined substantially rectangular openings extending therethrough and spaced apart from center to center by a distance equal to the circular pitch of said gearing, to provide the tooth intervals and promote the escape of dirt, the teeth of said member being formed from the portions of said strip between adjacent openings being each depressed at one side of said strip and projected at the other side thereof into a substantially semi-circular contour closely approximating, adjacent the pitch circle, the profile of an involute gear tooth, said teeth having their opposite ends spaced inwardly from the opposite edges of said strip and an involute spur pinion having teeth intermeshing with the teeth and tooth intervals of said gear member, said pinion teeth being of less length than said openings and adapted to project through said openings to the opposite side of said strip to prevent the accumulation of dirt and the clogging thereby of said gear member and pinion.

7. A driving gear including a gear member comprising a circular sheet steel strip having portions thereof detached to form a series of circumferentially aligned substantially rectangular openings extending therethrough and spaced apart from center to center by a distance equal to the circular pitch of said gearing, said openings having a length substantially equal to the length of the gear teeth and having a width longitudinally of said strip substantially equal to the distance between adjacent faces of adjacent teeth at the pitch circle, to provide tooth intervals adapted to promote the free escape of dirt, the teeth of said member being formed from the retained portions of said strip between adjacent openings and being of substantially concavo-convex shape in cross section depressed at one side of said strip and projected at the other side thereof into a substantially semi-circular contour closely approximating, adjacent the pitch circle, the profile of an involute gear tooth, said teeth having their opposite ends spaced inwardly from the opposite sides of said strip, and an involute spur pinion having teeth intermeshing with the teeth and tooth interval portions of said gear member, said pinion teeth being of less length than said openings of said member and adapted to project through said openings to the opposite side of said member for discharging dirt collecting between the mating gear faces of said member and pinion.

8. A gearing for driving agricultural machines and the like including a gear member comprising a radially extending, disk-like flange, a sheet steel ring having portions thereof removed to form a series of circumferentially alined substantially rectangular openings extending therethrough and spaced apart from center to center by a distance equal to the circular pitch of said gearing, to provide the tooth intervals, the teeth of said member being formed from the portions of said strip intermediate adjacent openings and being each depressed at one side of said strip and projected at the other side thereof into a substantially semi-circular contour closely approximating, adjacent the pitch circle, the profile of an involute gear tooth, said teeth having their opposite ends spaced inwardly from the opposite edges of said strip so as to leave said strip with unserrated marginal zones connecting the ends of said teeth, said ring having one side edge thereof welded concentrically to a side of said flange, and an involute spur pinion having teeth meshing with the teeth and tooth intervals of said gear member.

SAMUEL P. DE MATO.

REFERENCES CITED

The following references are of record in the file of this patent:

UNITED STATES PATENTS

| Number | Name | Date |
|---|---|---|
| 415,755 | Whiteley | Nov. 26, 1889 |
| 767,364 | Rathbun et al. | Aug. 9, 1904 |
| 988,106 | Johnston | Mar. 28, 1911 |
| 1,199,455 | Dunlap | Sept. 26, 1916 |
| 1,322,874 | Brull | Nov. 25, 1919 |
| 1,426,080 | Holt | Aug. 15, 1922 |
| 1,743,943 | Wagner | Nov. 22, 1923 |
| 1,902,224 | Eksergian | Mar. 21, 1933 |

FOREIGN PATENTS

| Number | Country | Date |
|---|---|---|
| 3,411 | Great Britain | Dec. 15, 1904 |
| 128,800 | Great Britain | July 3, 1919 |